(12) United States Patent
Han et al.

(10) Patent No.: US 10,346,723 B2
(45) Date of Patent: Jul. 9, 2019

(54) NEURAL NETWORK FOR OBJECT DETECTION IN IMAGES

(71) Applicant: SNAP INC., Venice, CA (US)

(72) Inventors: Wei Han, Champaign, IL (US); Jianchao Yang, Venice, CA (US); Ning Zhang, Los Angeles, CA (US); Jia Li, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 151 days.

(21) Appl. No.: 15/340,675

(22) Filed: Nov. 1, 2016

(65) Prior Publication Data

US 2018/0121762 A1    May 3, 2018

(51) Int. Cl.
| | | |
|---|---|---|
| *G06K 9/62* | (2006.01) | |
| *G06K 9/66* | (2006.01) | |
| *G06K 9/46* | (2006.01) | |
| *G06K 9/52* | (2006.01) | |
| *G06T 3/40* | (2006.01) | |
| *G06N 3/04* | (2006.01) | |
| *G06N 3/08* | (2006.01) | |

(52) U.S. Cl.
CPC ......... *G06K 9/6267* (2013.01); *G06K 9/4604* (2013.01); *G06K 9/4671* (2013.01); *G06K 9/52* (2013.01); *G06K 9/627* (2013.01); *G06K 9/6256* (2013.01); *G06K 9/66* (2013.01); *G06T 3/40* (2013.01); *G06K 9/4628* (2013.01); *G06N 3/0454* (2013.01); *G06N 3/084* (2013.01)

(58) Field of Classification Search
CPC .. G06K 9/4604; G06K 9/4628; G06K 9/4671; G06K 9/52; G06K 9/6256; G06K 9/6267; G06K 9/627; G06K 9/66; G06T 3/40
See application file for complete search history.

(56) References Cited

U.S. PATENT DOCUMENTS

| | | |
|---|---|---|
| 6,038,295 A | 3/2000 | Mattes |
| 6,980,909 B2 | 12/2005 | Root et al. |
| 7,173,651 B1 | 2/2007 | Knowles |
| 7,411,493 B2 | 8/2008 | Smith |

(Continued)

FOREIGN PATENT DOCUMENTS

| | | |
|---|---|---|
| CA | 2887596 A1 | 7/2015 |
| WO | WO-2018085425 A1 | 5/2018 |

OTHER PUBLICATIONS

Scalable Object Detection Using Deep Neural Networks Dumitru Erhan; Christian Szegedy; Alexander Toshev; Dragomir Anguelov 2014 IEEE Conference on Computer Vision and Pattern Recognition Year: 2014 pp. 2155-2162.*

(Continued)

*Primary Examiner* — Kim Y Vu
*Assistant Examiner* — Michael J Vanchy, Jr.
(74) *Attorney, Agent, or Firm* — Schwegman Lundberg & Woessner, P.A.

(57) ABSTRACT

Systems, devices, media, and methods are presented for identifying and categorically labeling objects within a set of images. The systems and methods receive an image depicting an object of interest, detect at least a portion of the object of interest within the image using a multilayer object model, determine context information, and identify the object of interest included in two or more bounding boxes.

20 Claims, 11 Drawing Sheets

(56) References Cited

U.S. PATENT DOCUMENTS

| | | | |
|---|---|---|---|
| 7,535,890 | B2 | 5/2009 | Rojas |
| 8,131,597 | B2 | 3/2012 | Hudetz |
| 8,199,747 | B2 | 6/2012 | Rojas et al. |
| 8,332,475 | B2 | 12/2012 | Rosen et al. |
| 8,718,333 | B2 | 5/2014 | Wolf et al. |
| 8,724,622 | B2 | 5/2014 | Rojas |
| 8,874,677 | B2 | 10/2014 | Rosen et al. |
| 8,909,679 | B2 | 12/2014 | Root et al. |
| 8,995,433 | B2 | 3/2015 | Rojas |
| 9,040,574 | B2 | 5/2015 | Wang et al. |
| 9,055,416 | B2 | 6/2015 | Rosen et al. |
| 9,100,806 | B2 | 8/2015 | Rosen et al. |
| 9,100,807 | B2 | 8/2015 | Rosen et al. |
| 9,191,776 | B2 | 11/2015 | Root et al. |
| 9,204,252 | B2 | 12/2015 | Root |
| 9,443,227 | B2 | 9/2016 | Evans et al. |
| 9,489,661 | B2 | 11/2016 | Evans et al. |
| 9,491,134 | B2 | 11/2016 | Rosen et al. |
| 2011/0202598 | A1 | 8/2011 | Evans et al. |
| 2012/0209924 | A1 | 8/2012 | Evans et al. |
| 2012/0323968 | A1* | 12/2012 | Yih .................. G06F 17/30613 707/780 |
| 2017/0011281 | A1* | 1/2017 | Dijkman .................. G06K 9/66 |
| 2017/0169400 | A1* | 6/2017 | Diwinsky .............. G06Q 10/20 |

OTHER PUBLICATIONS

Deep Neural Networks for Object Detection, Szegedy, Christian and Toshev, Alexander and Erhan, Dumitru, Advances in Neural Information Processing Systems 26, pp. 1-9, year: 2013.*

Leyden, John, "This SMS will self-destruct in 40 seconds", [Online], Retrieved from the Internet: <URL: http://www.theregister.co.uk/2005/12/12/stealthtext/, (Dec. 12, 2005), 1 pg.

"International Application Serial No. PCT/US2017/059564, International Report dated Feb. 8, 2018", 5 pgs.

"International Application Serial No. PCT/US2017/059564, Written Opinion dated Feb. 8, 2018", 10 pgs.

* cited by examiner

NEURAL NETWORK FOR OBJECT DETECTION IN IMAGES

TECHNICAL FIELD

Embodiments of the present disclosure relate generally to automated processing of images. More particularly, but not by way of limitation, the present disclosure addresses systems and methods for detecting and identifying objects within a set of images.

BACKGROUND

Telecommunications applications and devices can provide communication between multiple users using a variety of media, such as text, images, sound recordings, and/or video recordings. For example, video conferencing allows two or more individuals to communicate with each other using a combination of software applications, telecommunications devices, and a telecommunications network. Telecommunications devices may also record video streams to transmit as messages across a telecommunications network.

Currently, object detection processing often use a two-step approach by training a classification model for image-level predictions without bounding boxes and using weakly labeled classification data. The processes then use the trained classification model to classify images, taking localization into account. However, these processes often result in suboptimal utilization of model parameters and present difficulties in knowledge transfer based on various mismatches between the classification operations and localization concerns.

BRIEF DESCRIPTION OF THE DRAWINGS

Various ones of the appended drawings merely illustrate example embodiments of the present disclosure and should not be considered as limiting its scope.

Figure 1:
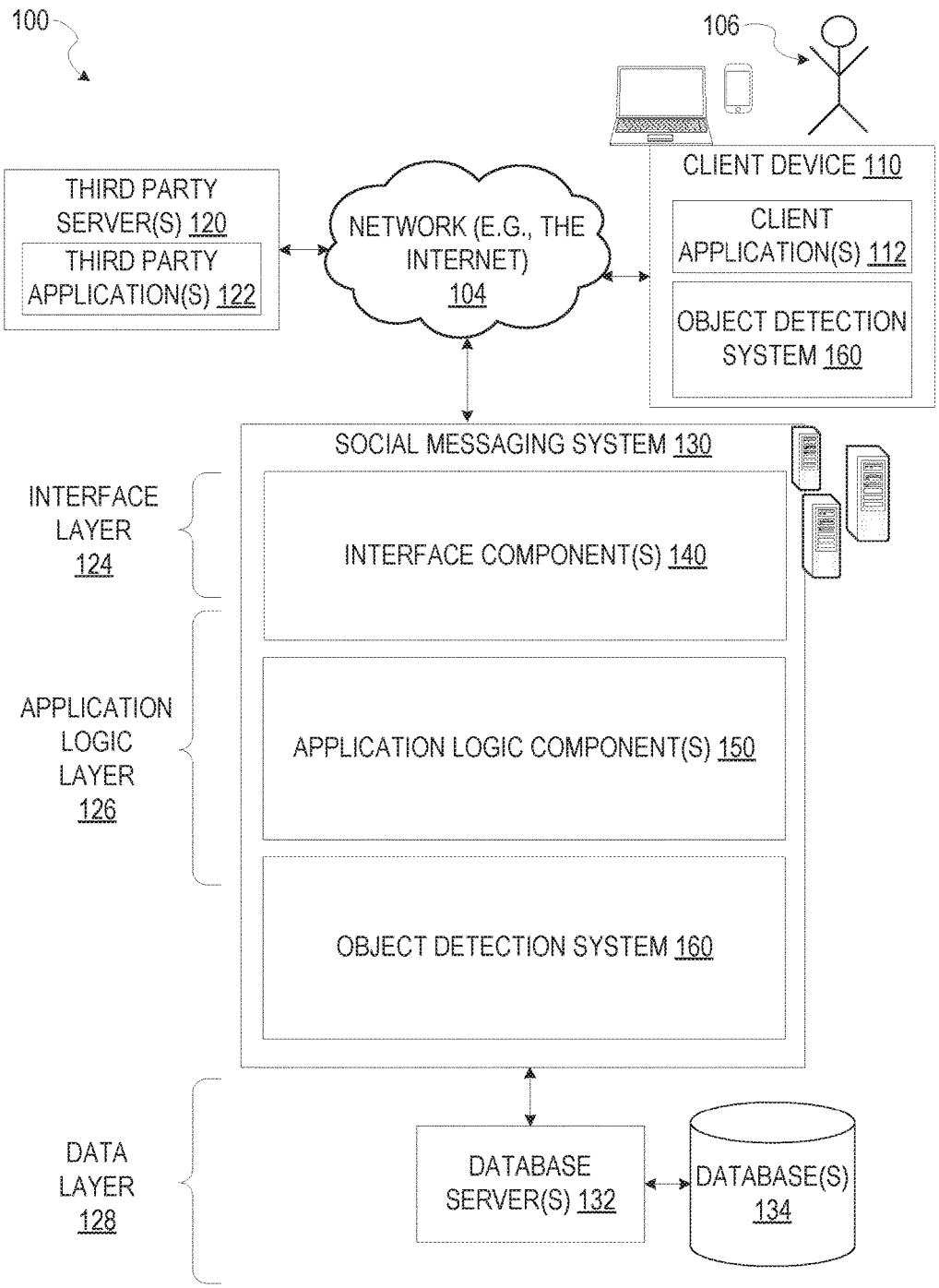
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

General object detection systems classify objects using categorical labels and localize objects present in input images. Object detection is performed and evaluated by mean average precision, a metric taking into account a quality of classification and localization. Accordingly, there is still a need in the art to improve identification, modeling, interpreting, and recognition of objects within images without user interaction or with minimal user interaction. Further, there is still a need in the art to improve generation of object models and recognition of interpreted or inferred aspects or contexts relating to an object which are not characteristics identified directly on the object. The present disclosure describes a unified model which trains all of the parameters of multiple layer models to detect and identify an object using a unified deep neural networking model. The unified model may enable a shared representation for multiple attribute recognition tasks. As described herein, methods and systems are presented for detecting and identifying objects within an image using a single user interaction of an initial selection.

As described herein, the present disclosure describes deep neural networks (DNN) may be used for object detection and identification. The DNNs are machine learning systems that are composed of multiple layers of models. The outputs of lower level layers may serve as inputs of higher level layers. In some embodiments, convolutional neural networks (CNN) can be used. CNNs are a type of DNN where inputs are assumed to have an image-like structure. The CNNs may also have inputs which are assumed to be images. Each neuron is connected to limited spatial extent on the image. In some instances, gradient descent may be used as an optimization algorithm for neural network learning, to train a multilayer object model and detect and identify objects within images. A loss function may be defined and training data may be provided to iteratively adjust model parameters using the gradient descent algorithm. The iterative adjustment of model parameters may minimize the loss function for the training data in order to enable higher confidence levels in identifying objects of interest. In some instances, gradient descent may include back propagation. Back propagation may be used to calculate the gradient descent for the multilayer object model.

Embodiments of the present disclosure may relate generally to automated image segmentation and neural network processing of the images to detect and identify objects within the image. In one embodiment, an object detection system accesses or receives images depicting one or more objects of interest to be identified. The object detection system may generate a set of bounding boxes within an image. The object detection system detects objects of interest within the bounding boxes generated within the image and determines context information for the object of interest. The object detection system may then identify the object of interest from portions of the object of interest detected within the bounding boxes.

In some embodiments, the object detection system uses design principles of limiting fields of view and strides of a deep neural network or convolutional neural network. In some embodiments, the convolutional neural network employs a plurality of convolutional layers. The convolutional layers may each have a filter size. In some instances, filters of convolutional levels having a size larger than one increase the field of view of layers used later by the object detection system. Each convolutional layer or pooling layer of the convolutional neural network may have a stride. Where the stride is larger than one, the convolutional layer or pooling layer may increase the stride for a subsequent layer. In some embodiments, the field of view is controlled such that the models' representation may be concentrated on a fixed scale. Control of the field of view may maintain a fixed size increase or fixed size strides to enable precise localization during one or more of training a multilayer object model or detecting objects of interest using a multilayer object model.

Data used for pre-training of the multilayer object model may be controlled to constrain the model to learn translation and scale specific features or parameters within the model. Pre-training of the multilayer object model may include use of bounding box labels or may forego use of bounding box labels. In some embodiments, when bounding box labels are available, the object detection system may center crop objects and rescale the object to a fixed image resolution. Background image patches may also be sampled. The combination of fixed image resolution objects and background image patches may be used to train the multilayer object model such that all of the objects used for training are viewed on the same scale. When bounding box labels are unavailable, the multilayer object model may be trained using images having a high resolution. Portions of the model (e.g., one or more layers of the multilayer object model) may be limited to a smaller field of view (e.g., a lower resolution) than the training images. In some instances, a last one or more layers of the multilayer object model may employ the high resolutions and fields of view in the training process. In some embodiments, the multilayer object model may be trained in a weakly supervised setting. Using a weakly supervised setting, the multilayer object model may be applied to multiple copies of a single image, where each copy has a differing resolution.

In some embodiments, the multilayer object model is controlled with respect to capacity in convolution layers. In these embodiments, the multilayer object model has one by one convolutions. The use of one by one convolutions increase model capacity without changing a field of view or strides.

The above is one specific example. The various embodiments of the present disclosure relate to devices and instructions by one or more processors of a device to model and draw automated inferences for an object of interest within an image or a video stream. In some instances, the object of interest is a face within an image or video stream transmitted by the device to another device while the video stream is being captured (e.g., modifying a video stream in real time). In some instances, the image or video stream containing the object of interest may be received and processed within a machine, such as a car (e.g., performing object detection for crash avoidance), an airplane, an augmented reality headset, a mobile device, or any other suitable machine. An object detection system is described that identifies and generates inferences for objects and areas of interest within an image or across a video stream and through a set of images comprising the video stream. In various example embodiments, the object detection system identifies and tracks one or more facial features depicted in a video stream or within an image and performs image recognition, facial recognition, and facial processing functions with respect to the one or more facial features and interrelations between two or more facial features. Although described with respect to facial features and faces, example embodiments of the object detection system also identify, track, and generate inferences for objects of interest detected by cars, airplanes, and boats for navigation and crash avoidance; by cameras for image capture parameter adjustment; by construction equipment for crash avoidance and automated building or debris clearance; by augmented reality devices for transforming real world objects into gaming elements; or any other suitable device, system, or machine.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although the network system 100 is illustrated herein as client-server architecture, other embodiments may include other network architectures, such as peer-to-peer or distributed network environments. Additionally, some embodiments may operate within a single client device, with an object detection system 160 processing images captured by an image sensor of the device, without any use or communication via network 104. In other embodiments, images may be received at a client device 110 via network 104, or various operations of object detection system may communicate with other devices via network 104.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of instructions, as a special purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface component(s) (e.g., a web server) 140, which receives requests from various client-computing devices and servers, such as client devices 110 executing client application(s) 112, and third party server(s) 120 executing third party application(s) 122. In response to received requests, the interface component 140 communicates appropriate responses to requesting devices via a network 104. For example, the interface components 140 can receive requests such as Hypertext Transfer Protocol (HTTP) requests, or other web-based, Application Programming Interface (API) requests.

The client devices 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client devices 110 form all or part of an object detection system 160 such that components of the object detection system 160 configure the client device 110 to perform a specific set of functions with respect to operations of the object detection system 160.

In an example, the client devices 110 are executing the client application(s) 112. The client application(s) 112 can provide functionality to present information to a user 106 and communicate via the network 104 to exchange information with the social messaging system 130. Further, in some examples, the client devices 110 execute functionality of the object detection system 160 to segment images of video streams during capture of the video streams and transmit the video streams (e.g., with image data modified based on the segmented images of the video stream).

Each of the client devices 110 can comprise a computing device that includes at least a display and communication capabilities with the network 104 to access the social messaging system 130, other client devices, and third party servers 120. The client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client devices 110. In some embodiments, the user 106 interacts with the social messaging system 130 via the client devices 110. The user 106 may not be part of the networked environment, but may be associated with the client devices 110.

As shown in FIG. 1, the data layer 128 has database servers 132 that facilitate access to information storage repositories or databases 134. The databases 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface components 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with one or more of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

As illustrated in FIG. 1, the social messaging system 130 may include at least a portion of the object detection system 160 capable of detecting and identifying an object of interest within an image, a set of images, or a set of frames within video data during capture of the video data by the client device 110. Similarly, the client device 110 includes a portion of the object detection system 160, as described above. In other examples, client device 110 may include the entirety of the object detection system 160. In instances where the client device 110 includes a portion of (or all of) the object detection system 160, the client device 110 can work alone or in cooperation with the social messaging system 130 to provide the functionality of the object detection system 160 described herein.

In some embodiments, the social messaging system 130 may be an ephemeral message system that enables ephemeral communications where content (e.g., video clips or images) are deleted following a deletion trigger event such as a viewing time or viewing completion. In such embodiments, a device uses the various components described herein within the context of any of generating, sending, receiving, or displaying aspects of an ephemeral message. For example, a device implementing the object detection system 160 may identify, track, and modify an object of interest, such as pixels representing skin on a face depicted in the video clip. The device may modify the object of interest during capture of the video clip without image processing after capture of the video clip as a part of a generation of content for an ephemeral message. In another example embodiment, the device implementing the object detection system 160 may identify, track, and cause automated operations of one or more other systems implemented by the device. For instance, where the device is a self-driving car, the object detection system 160 of the self-driving car may identify and track objects within a predetermined proximity to the car. Upon detecting an object of interest of a specified object class, the object detection system 160 may cause the self-driving car to issue an alert to passengers, initiate braking, initiate a turning maneuver, or any other suitable response to the detected object of interest.

Figure 2:
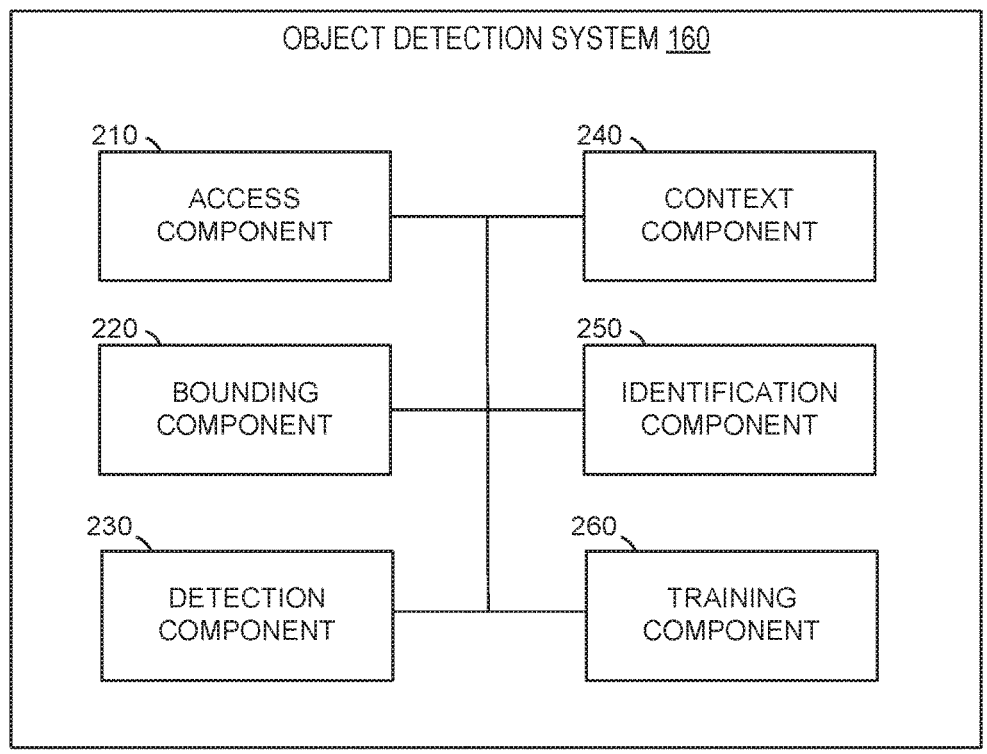
FIG. 2 is a diagram illustrating an object detection system, according to some example embodiments.

In FIG. 2, in various embodiments, the object detection system 160 can be implemented as a standalone system or implemented in conjunction with the client device 110, and is not necessarily included in the social messaging system 130. The object detection system 160 is shown to include an access component 210, a bounding component 220, a detection component 230, a context component 240, an identification component 250, and a training component 260. All. or some, of the components 210-260 communicate with each other, for example, via a network coupling, shared memory, and the like. Each component of components 210-260 can be implemented as a single component, combined into other components, or further subdivided into multiple components. Other components not pertinent to example embodiments can also be included, but are not shown.

The access component 210 accesses or otherwise retrieves images depicting objects of interest. In some instances, the access component 210 accesses the images from a database or data structure. The access component 210 may also access or receive the image or a set of images (e.g., one or more frames of a video stream) from an image capture device. In some embodiments, the access component 210 includes portions or all of an image capture component configured to cause an image capture device of the client device 110 to capture images based on user interaction with a user interface presented on a display device of the client device 110. The access component 210 may pass images or portions of images to one or more other components of the object detection system 160.

The bounding component 220 generates or accesses a set of bounding boxes within an image or associated with an image or set of images. The bounding component 220 may generate the set of bounding boxes using a multilayer object model. In some embodiments, the bounding component 220 identifies a set of coordinates within images, determines a set of sizes and aspect ratios for the set of bounding boxes, and determines a distribution of the set of bounding boxes within the image. Distribution of the set of bounding boxes may be uniform over the image or set of images to encompass a set of coordinates comprising the image or set of images.

The detection component 230 detects at least a portion of objects of interest within the image in bounding boxes. In some embodiments, the detection component 230 detects objects of interest using detection layers of the multilayer object model. The detection component 230 may detect portions of the object of interest using differing layers for each bounding box. The detection layers may be associated with bounding boxes of specified characteristics including aspect ratios, sizes, and types of objects depicted within the bounding boxes.

The context component 240 determines context information by passing layer outputs between detection layers. The context component 240 may incorporate the layer output into the layer output of the detection layer to which the layer output was passed. The context component 240, alone or in combination with one or more other components, may identify information from a background of the image surrounding the object of interest.

The identification component 250 identifies objects of interest from portions of the object of interest included within the set of bounding boxes. The identification component 250 may identify the objects of interest using image representation layers of the multilayer object model. In some instances, the identification component 250 may identify the object of interest within a class, a type, or other identifying characteristic or category. The identification component 250 may use one or more algorithms, functions, or operations to identify the objects of interest.

The training component 260 iteratively adjusts model parameters to train layers of the multilayer object model. In some embodiments, the training component 260 initializes the one or more model parameters using a Gaussian distribution. Model parameters may be initialized in a singular manner or may be initialized in related groups. The training component 260 may adjust the model parameters to generate average loss function values.

Figure 3:
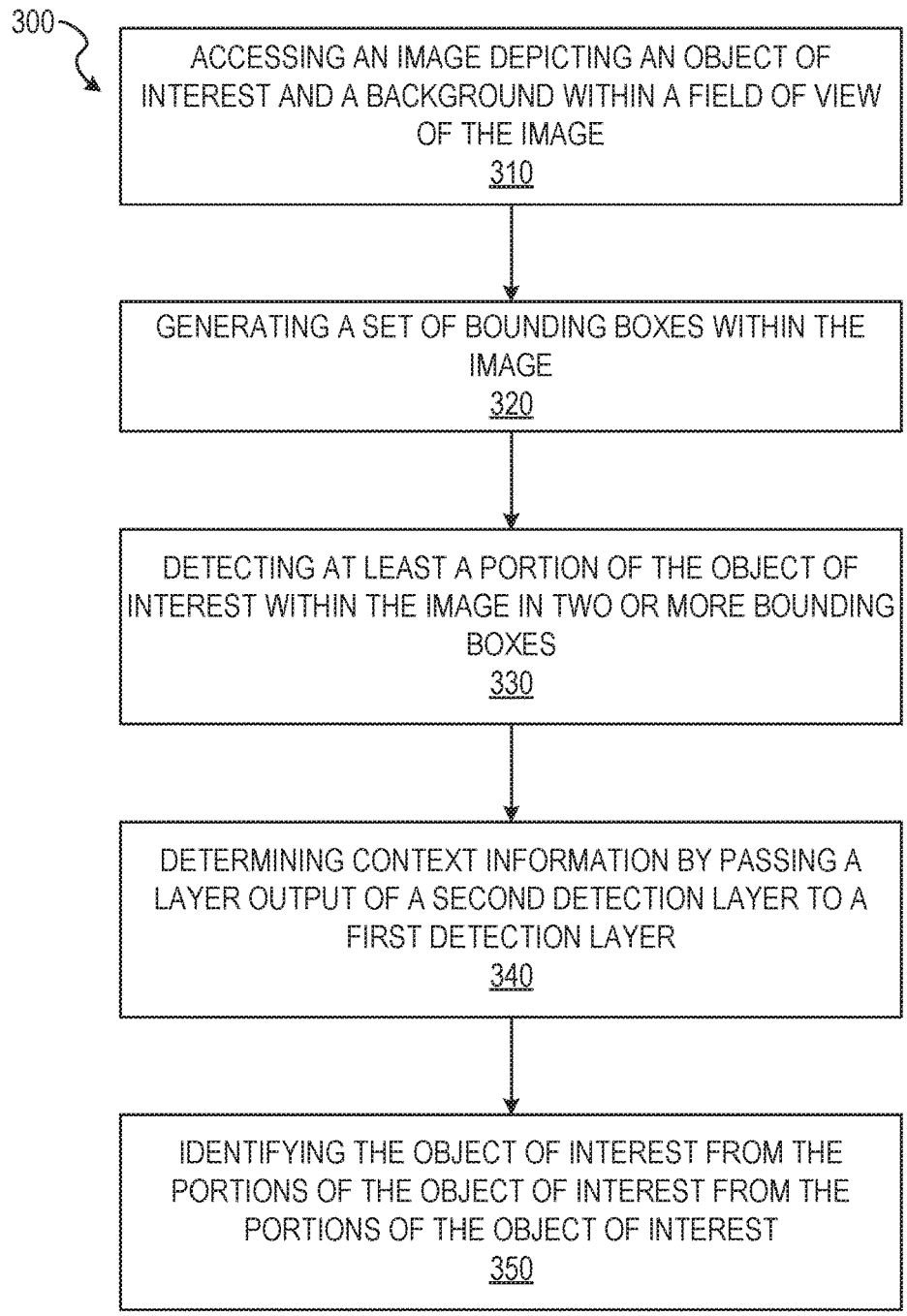
FIG. 3 is a flow diagram illustrating an example method for detecting and identifying objects within an image, according to some example embodiments.

FIG. 3 depicts a flow diagram illustrating an example method 300 for detecting and identifying objects within an image, a set of images, or frames within a video stream. The operations of method 300 may be performed by components of the object detection system 160, and are so described below for purposes of illustration.

In operation 310, the access component 210 accesses or otherwise receives an image depicting an object of interest and a background within a field of view. In some instances, the access component 210 accesses the image on a database or within a data structure. The database or data structure may be coupled or otherwise accessible by the client device 110. For example, the access component 210 may access the image stored in a computer-readable storage device (e.g., a memory component) of the client device 110 or a third-party system. In these instances, the access component 210 may access the third-party system via a network connection between the client device 110 and the third-party system.

In some embodiments, the access component 210 receives the image as a single image, a set of images, or within frames of a video stream captured by an image capture device associated with the client device 110. In some instances, the image, the set of images, or the video stream is presented on a user interface of the object detection application. The access component 210 may include the image capture device as a portion of hardware comprising the access component 210. In these embodiments, the access component 210 directly receives the image, the set of images, or the video stream captured by the image capture device. In some instances, the access component 210 passes all or a part of the image, the set of images, or the video stream (e.g., a set of images comprising the video stream) to one or more components of the object detection system 160, as described below in more detail.

In some example embodiments, the access component 210 accesses the image within a plurality of frames within a video stream. The access component 210 may select the image from one or more of the frames of the video stream. The selection of the image may be performed by the access component 210 in response to a manual selection (e.g., user selection of the image). In some instances, the access component 210 selects the image from the frames of the video stream automatically without input from a user of the client device. The access component 210 may select the image from the frames by performing one or more image detection operations, described in detail below, to perform an initial detection of the object in the image. Once an object is initially detected, the access component 210 may pass the image or a set of images to one or more other components of the object detection system 160 for further detection and identification of the object of interest using one or more of the operations described in the methods below.

In operation 320, the bounding component 220 generates a set of bounding boxes within the image. In some example embodiments, the bounding component 220 generates the set of bounding boxes using a multilayer object model. Each bounding box of the set of bounding boxes may be generated as a set of coordinate data and a label. The set of coordinate data may indicate a position, size or scale, and aspect ratio of the bounding box. The label may be configured to receive a designation, representation, class, or other identifying description of an object depicted within the set of coordinates comprising the bounding box. In some embodiments, a bounding box is represented as tuples of coordinate elements and a class label. For example, the bounding box may be represented by <xmin, xmax, ymin, ymax, obj_cls>. In this example, the xmin and xmax represent x axis coordinates and the ymin and ymax represent y axis coordinates within the image. The x and y axis coordinates may indicate a top left and bottom right of the bounding box. The class label may initially be generated without a value. For example, the class label may initially be generated having no value, a null value, or another placeholder value. In these embodiments, the class label may be filled, modified, or otherwise supplied a value upon detecting or classifying an object within the bounding box. Once the object detection system 160 identifies an object detected within the bounding box, one or more component of the object detection system 160 may cooperate to modify the bounding box to include a value in the class label indicating an identification for the object of interest.

In some embodiments, two or more bounding boxes of the set of bounding boxes overlap. The set of bounding boxes may be generated such that some bounding boxes have differing sizes, aspect ratios, coordinates, and other parameters. As described below in more detail, the bounding boxes generated for the image may be distributed across the image to incorporate each coordinate within the image in at least one bounding box. Although described with respect to two or more bounding boxes, in some instances, the system may output a single bounding box.

In operation 330, the detection component 230 detects at least a portion of the object of interest within the image in two or more bounding boxes of the set of bounding boxes. In some example embodiments, the detection component 230 detects the object of interest using a set of detection layers of the multilayer object model. In some embodiments, the detection component 230 detects the portion of the object of interest using distinct detection layers for each of the two or more bounding boxes. For example, each detection layer may be associated with a single bounding box or portion of the set of bounding boxes. In some instances, the detection component 230 uses distinct detection layers for certain bounding boxes of the two or more bounding boxes. For example, each detection layer of the set of detection layers may be associated with a specified parameter, such that a detection layer performs detection operations on bounding boxes of the two or more bounding boxes which have the specified parameter. The detection layers may detect the object of interest or at least a portion of the object of interest within the bounding boxes using one or more object detection methods such as image segmentation, blob analysis, edge matching or edge detection, gradient matching, grayscale matching, or any other suitable object detection method. In some embodiments, the detection layers use one or more selected aspects of the object detections referenced above without employing all portions of a selected object detection method. Further, in some instances, the detection layers use operations similar in function or result to one or more of the object detection methods described above derived from or contained within a machine learned model. The machine learned model may be generated by one or more of the machine learning techniques described in the present disclosure.

In operation 340, the context component 240 determines context information by passing a layer output of a second detection layer to a first detection layer. In some example embodiments, the context component 240 incorporates the layer output of the second layer into the layer output of the first detection layer. The context component 240 may receive indications of small sized objects of interest within at least one of the two or more bounding boxes. The context component 240 or the detection component 230 may determine that the objects of interest are small sized based on one or more aspects of the objects of interest, or the entire object of interest, occupying a portion of the bounding box or the image which is below a predetermined size, coordinate set, pixel count, or other measurement. In some instances, the context component 240 identifies information from the background within the bounding box or objects within the bounding box which are not a part of the object of interest. The information may be obtained through the one or more image representation methods or object detection methods, described above.

In some example embodiments, the layer output of the second detection layer is passed to the first detection layer using a deconvolution layer of the multilayer object model. The context component 240, using the image representation layers as convolutional layers in a convolutional neural network, passes the output of the image representation layers to deconvolution layers within the convolutional neural network. In these embodiments, each image representation layer may generate an output and pass the output backwards to an earlier deconvolution layer. The deconvolution layer may receive output as learnable parameters. The deconvolution layer may generate output which is combined with the output of the image representation layer to which information has been passed. In some embodiments, the output of the deconvolution layer may include an image description for a larger image size or bounding box size than a corresponding convolution layer of the same level. When passed to an earlier convolution layer producing output of the same size as that of the deconvolution layer, the context component 240 may element-wise sum the outputs from the image representation layer and the deconvolution layer into a combined layer output. In these embodiments, the context component 240 enables multiple layers of the convolutional neural network and deconvolution layers to combine to act as detectors accessing context information and maintaining compact feature dimensions while identifying the object of interest within the two or more bounding boxes. The element-wise summation may be complementary to the outputs of the convolution layer and a corresponding output supplied by a deconvolution layer. In some instances, the element-wise summation reaffirms a confidence score identifying an object within a bounding box. The element-wise summation may also correct false positive identifications for objects within a bounding box.

In some instances, the element-wise summation compares one or more of the object class and a confidence score determined for one or more bounding boxes. The object class may be supplied by one or more convolution layer and one or more deconvolution layer. Where the object classes are determined to be similar or the same, the element-wise summation may be complementary. In some instances, where object classes of two bounding boxes differ, the context component 240 may compare confidence scores for each of the outputs. The context component 240 may weight a higher confidence score associated with a larger bounding box than a lower confidence score or a higher confidence score associates with a smaller bounding box.

In operation 350, the identification component 250 identifies the object of interest from the portions of the object of interest included within the two or more bounding boxes. The identification component 250 identifies the object of interest using a set of image representation layers of the multilayer object model. In some example embodiments, operation 350 is performed based on detecting the portion of the object of interest (e.g., operation 330) and determining the context information (e.g., operation 340). In some embodiments, the set of image representation layers may identify the object of interest using feature-based object detection, Viola-Jones object detection, support vector machine classification with histogram of oriented gradient features, interpretation trees, pose clustering, scale-invariant feature transform, speeded up robust features, genetic algorithms, or any other suitable object identification method. Each image representation layer of the set of image representation layers may perform the object identification method or methods on a specified bounding box of the two or more bounding boxes. In some embodiments, each image representation layer may perform one or more object identification methods on a single bounding box, or on one or more bounding boxes sharing a common parameter. As described above, the image representation layers may incorporate outputs of layers of the detection component 230 and deconvolution layers of the context component 240 to identify the object of interest, using context, from the two bounding boxes. In some embodiments, the image representation layers use one or more selected aspects of the object detection methods referenced above without employing all portions of a selected object detection method. Further, in some instances, the image representation layers use operations similar in function or result to one or more of the object detection methods described above derived from or contained within a machine learned model. The machine learned model may be generated by one or more of the machine learning techniques described in the present disclosure.

Figure 4:
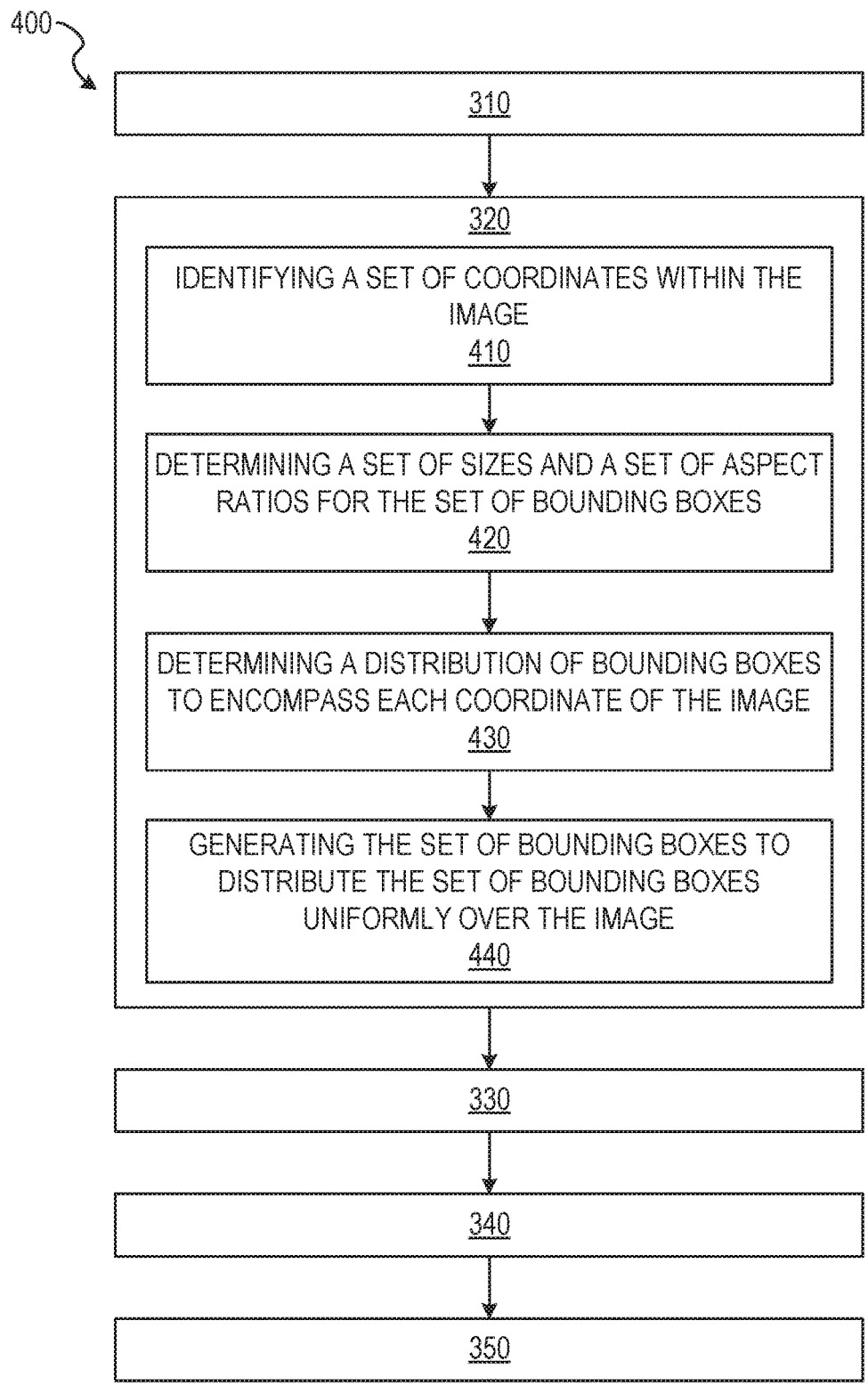
FIG. 4 is a flow diagram illustrating an example method for detecting and identifying objects within an image, according to some example embodiments.

FIG. 4 shows a flow diagram illustrating an example method 400 for detecting and identifying objects within an image, a set of images, or frames within a video stream. The operations of method 400 may be performed by components of the object detection system 160. In some instances, certain operations of the method 400 may be performed using one or more operations of the method 300 or as sub-operations of one or more operations of the method 300, as will be explained in more detail below. For example, as shown in FIG. 4, operations of the method 400 may be part of or sub-operations of operation 320.

In operation 410, the bounding component 220 identifies a set of coordinates within the image. The set of coordinates includes an indication of one or more boundaries for the image. In some embodiments, as described above, the set of coordinates may be represented by tuples. As described above, the tuples may include coordinates such as xmin, xmax, ymin, and ymax. The minimum and maximums represent a top left and a bottom right of the bounding box within a set of coordinates delineating the boundaries of the image and points therein. Although described as a set of tuples, the set of coordinates may be any set of coordinates which indicate boundaries of the box as an identifiable location within the image. In some instances, the set of coordinates may indicate an aspect ratio, a size, a number or other label for the bounding box, and any other suitable identification information.

In operation 420, the bounding component 220 determines a set of sizes and a set of aspect ratios for the set of bounding boxes. The set of sizes and the set of aspect ratios may be predetermined for the set of bounding boxes or may be dynamically determined. In some instances, the bounding component 220 determines the set of sizes and the set of aspect ratios based on dimensions of the image. For example, the set of aspect ratios may include aspect ratios matching an aspect ratio of the image in a vertical orientation and a horizontal orientation. The set of aspect ratios may include aspect ratios differing from the aspect ratios of the image. The set of sizes may include pixel dimensions smaller than that of the image. In some embodiments, the set of sizes includes a plurality of pixel dimensions smaller than the dimensions of the image and above a predetermined minimum size. In these instances, the plurality of pixel dimensions may include two or more discrete pixel dimensions set apart by a specified interval. For example, the set of sizes may include a minimum size (e.g., a minimum pixel dimension), a maximum size (e.g., a maximum pixel dimension matching or below the pixel dimensions of the image), and one or more pixel dimensions at a size between the minimum size and the maximum size. The one or more pixel dimensions between the minimum and maximum sizes may increase in size by a predetermined threshold or interval (e.g., 10%, 25%, 50%, etc.).

In some embodiments, the set of sizes and the set of aspect ratios may be determined based on information accessed in conjunction with the image. The image may contain or be associated with description data, image capture data (e.g., image capture parameters), device data (e.g., information describing the device capturing the image), and any other suitable data. Where the image capture data indicates a macro photography setting, a small focal area setting (e.g., a focus area within the image having an area below a predetermined threshold), or an image selection indicating relatively small areas of interest, the set of sizes and set of aspect ratios may be determined having sizes and ratios suitable for detection of small or detailed objects within the image. For example, a portion of the set of sizes may be close to a minimum size for the image to focus on smaller portions or aspects of an object of interest or area of the image and portions of the set of sizes may be at a medial size, between the minimum size and a maximum size, to encompass small objects of interest and portions of background or contextual image information. Further, the set of aspect ratios may vary, and may be configured to capture portions of background or contextual image information surrounding small objects of interest. Although described with respect to small areas of interest or objects of interest, it should be understood that the set of sizes and the set of aspect ratios may be determined, using information associated with the image, image capture mode, or device, to tailor the set of sizes and the set of aspect ratios for expected object types, sizes, or other characteristics of potential objects of interest within an image.

In operation 430, the bounding component 220 determines a distribution of bounding boxes to encompass each coordinate of the set of coordinates in at least one bounding box of the set of bounding boxes. In some embodiments, the bounding boxes are distributed in a sliding window fashion. In some embodiments, the sliding window distribution of the set of bounding boxes may be organized starting at a first corner (e.g., upper left) of the image and iteratively span all of the coordinates of the image from the first corner to a second corner (e.g., lower right). In some embodiments, the set of bounding boxes may be distributed in a predetermined pattern, a dynamic pattern (e.g., generated based on one or more parameters of the image), randomly, or in any suitable manner. In some instances, the set of bounding boxes may be distributed, having a predetermined off set, such that a predetermined number of bounding boxes are evenly distributed across the image. The set of bounding boxes includes about 7,000 bounding boxes, in some embodiments.

In operation 440, the bounding component 220 generates the set of bounding boxes to distribute the set of bounding boxes uniformly over the image. In some example embodiments, each bounding box of the set of bounding boxes is generated with a size included in the set of sizes and an aspect ratio included in the set of aspect ratios. In some embodiments, each bounding box is generated in a distributed format, such that each bounding box is associated with a point, set of points, pixel, set of pixels, coordinate, or set of coordinates within the image. In some embodiments, the set of bounding boxes is generated and distributed as an overlay or set of overlay elements. In some instances, the set of bounding boxes is generated and distributed within a data structure such that each bounding box of the set of bounding boxes is associated with a location (e.g., one or more points, coordinates, or pixels) within the image. Once the bounding boxes are generated and distributed within the data structure, the bounding component 220 may pass the data structure, or information identifying the bounding boxes and the locations within the image, to the detection component 230 to enable the detection component 230 to detect at least a portion of the object of interest within the image in two or more bounding boxes of the set of bounding boxes, as described with respect to operation 330.

In some example embodiments, the set of bounding boxes includes at least one bounding box having a first size and a first aspect ratio. In some embodiments, the set of bounding boxes also includes at least one bounding box having a second size and a second aspect ratio. The second size may be distinct from the first size. In some instances, the first aspect ratio is distinct from the second aspect ratio. In these instances, bounding boxes within the set of bounding boxes may be configured to enable detection of objects of differing sizes, shapes, types, and levels of detail. In some embodiments, the detection component 230 attempts to detect objects in one or more bounding box until the detection component 230 detects an object of interest in two or more of the bounding boxes (e.g., the at least one bounding box of the first size and aspect ratio and the at least one bounding box of the second size and aspect ratio). The detection component 230 may determine detection of the object of interest within the two or more bounding boxes where an indication of confidence, generated by the detection component 230, for each of the bounding boxes (e.g., the two or more bounding boxes) exceeds a confidence threshold.

Figure 5:
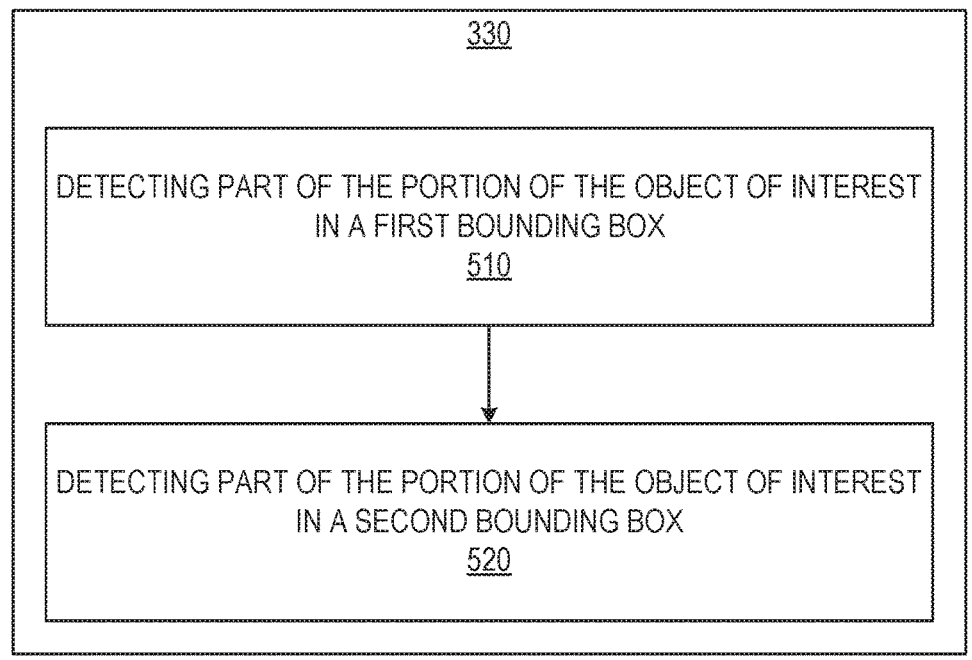
FIG. 5 is a flow diagram illustrating an example method for detecting and identifying objects within an image, according to some example embodiments.

FIG. 5 depicts a flow diagram illustrating an example method 500 for detecting and identifying objects within an image, a set of images, or frames within a video stream. The operations of method 500 may be performed by components of the object detection system 160. In some instances, certain operations of the method 500 may be performed using one or more operations of the methods 300 or 400, in one or more of the described embodiments, or as sub-operations of one or more operations of the methods 300 or 400, as will be explained in more detail below. For example, in some embodiments, operations of the method 500 may be performed as part of or sub-operations of operation 330.

In operation 510, the detection component 230 detects part of the portion of the object of interest in a first bounding box of the two or more bounding boxes using a first detection layer. The first detection layer may be associated with a first scale. The first scale may correspond to the first bounding box. In some example embodiments, the first detection layer generates a first confidence score and a first set of coordinates. The first set of coordinates may represent a location for the part of the object of interest depicted within the first bounding box.

In some instances, the detection component 230 employs the first detection layer on a series of bounding boxes until the detection component 230 detects an identifiable part or all of an object (e.g., the object of interest) within a bounding box. In using the first detection layer, the detection component 230 may generate a confidence score for each of the series of bounding boxes indicating a level of confidence that an object or an identifiable object has been detected within a bounding box. Upon detecting the object of interest or an identifiable portion of the object of interest within a bounding box, the bounding box may be identified as the first bounding box.

In operation 520, the detection component 230 detects part of the portion of the object of interest in a second bounding box of the two or more bounding boxes. The detection component 230 may use a second detection layer to detect the portion of the object of interest in the second bounding box. The second detection layer may be associated with a second scale. The second scale may correspond to the second bounding box. In some example embodiments, the second detection layer generates a second confidence score and a second set of coordinates. The second set of coordinates may represent the part of the object of interest depicted within the second bounding box. The second bounding box may be identified and the object of interest detected within the second bounding box in a manner similar to or the same as that described for operation 510.

Although described with respect to a first bounding box and a second bounding box, it should be understood that the detection component 230 may detect the object of interest in any suitable number of bounding boxes. In some instances, the detection component 230 continues detecting portions of the object of interest within subsequent bounding boxes of the set of bounding boxes until the detection component 230 determines all of the object of interest, depicted within the image, has been detected as contained in a subset of bounding boxes. The subset of bounding boxes may be a number of bounding boxes, selected from the set of bounding boxes, which contain at least a portion of the object of interest.

In some embodiments, the detection component 230 determines that the object of interest is contained across a plurality of bounding boxes but not contained in any single bounding box of the set of bounding boxes. In response to the object of interest being detected in the plurality of bounding boxes and not in a single bounding box, the detection component 230 may pass an indication to the bounding component 220. In response to receiving the indication, the bounding component 220 may generate one or more new bounding boxes to encompass the object of interest. Each of the one or more new bounding boxes may contain all of the depicted object of interest. The object of interest may also be contained within a single bounding box of the set of bounding boxes. Where the detection component 230 determines the object of interest is contained within a single bounding box, the detection component 230 may pass an indication to the bounding component 220 to generate at least one additional bounding box containing the object of interest but having one or more of a size and an aspect ratio differing from that of the single bounding box previously identified.

Figure 6:
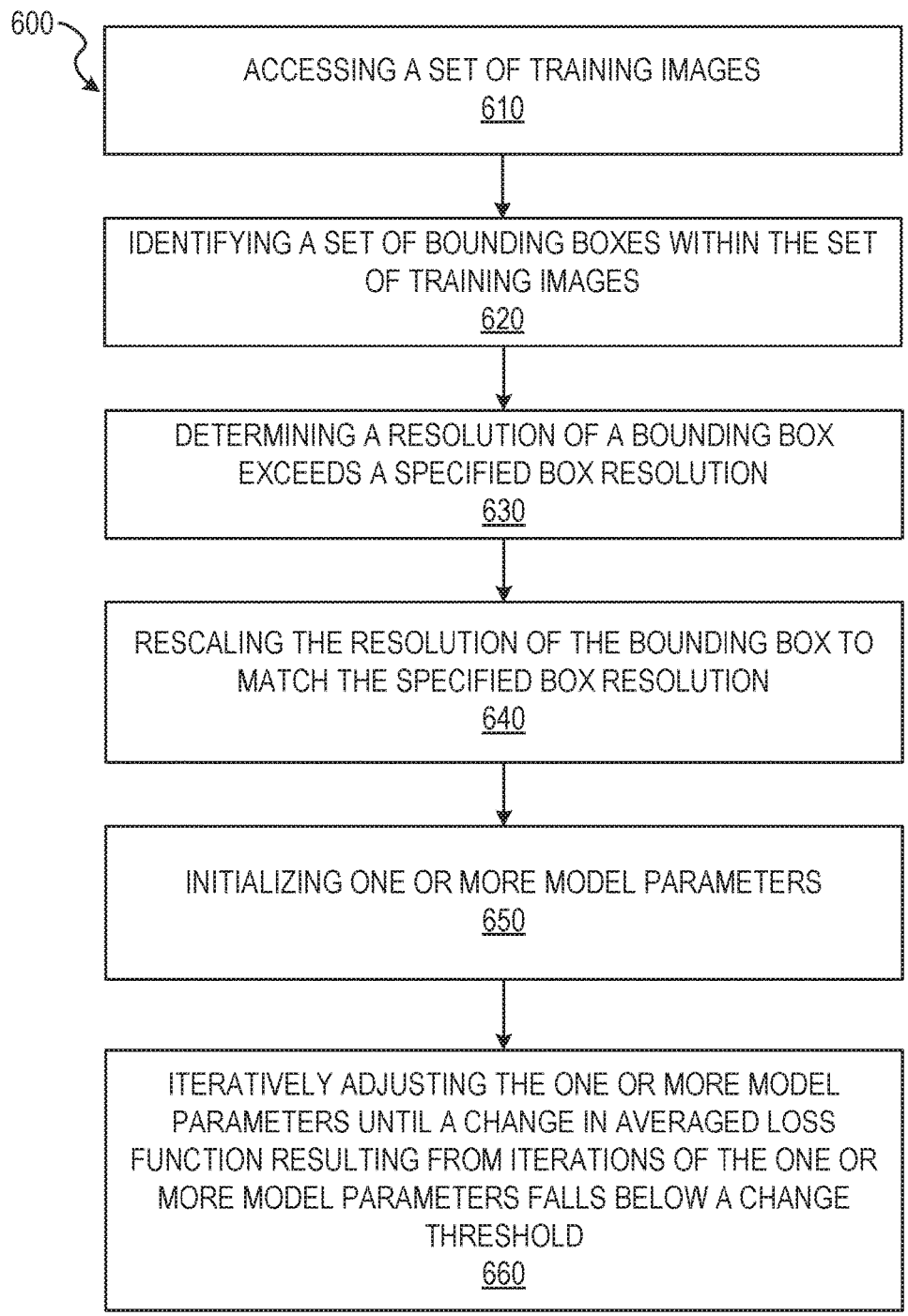
FIG. 6 is a flow diagram illustrating an example method for detecting and identifying objects within an image, according to some example embodiments.

FIG. 6 shows a flow diagram illustrating an example method 600 for detecting and identifying objects within an image, a set of images, or frames within a video stream. The operations of method 600 may be performed by components of the object detection system 160. In some instances, certain operations of the method 600 may be performed using one or more operations of the method 300, 400, or 500 or as sub-operations or precursor operations of one or more operations of the method 300, 400, or 500, as will be explained in more detail below. In some embodiments, the method 600 trains the multilayer object model. In training the multilayer object model, the method 600 may pre-train the multilayer object model to learn translation/scale specific features.

In operation 610, the access component 210 accesses a set of training images. Each training image depicts a known object of interest. In some example embodiments, the access component 210 accesses the set of training images as a set of images or set of frames of a video stream within a data structure or being received from an image capture device. For example, the access component 210 may access the set of training images stored in a computer-readable storage device (e.g., a memory component) of the client device 110 or a third-party system. By way of another example, the access component 210 may access the set of training images within a set of frames of a video stream being captured by the image capture device. The set of training images may include a known object of interest. In some embodiments, each image of the set of training images may include data or be associated with data (e.g., metadata) indicating an identity, class, type, or other identifying information for the object of interest, or plurality of objects of interest, depicted within the set of training images. In addition to identifying information, in some instances, each training image of the set of training images includes location data identifying a location of at least a portion of the object of interest within that training image.

In operation 620 the bounding component 220 identifies a set of bounding boxes within the set of training images. Each bounding box may have a set of coordinates identifying a location within the training image, a resolution, and a label. In some embodiments, the bounding component 220 may identify the set of bounding boxes in a manner similar to or the same as described with respect to operations 320, 410-440, or 510-520. In some instances, the bounding component 220 identifies the set of bounding boxes as a set of predefined bounding boxes within or associated with the set of training images. For example, the set of bounding boxes may be included as data in or associated with one or more training images of the set of training images. The set of bounding boxes may be included as data within a data structure associated with one or more of the training images of the set of training images.

In operation 630, the bounding component 220 determines the resolution of a bounding box exceeds a specified box resolution. In order to train the multilayer object model, the bounding component 220 may determine resolutions for bounding boxes generated by the bounding component 220 with respect to portions of the image or predetermined bounding boxes associated with the image. The bounding component 220 may use bounding box labels to identify a suitable resolution for the object of interest within a training image containing the bounding box. The resolution may be a measurement, a pixel count, a coordinate set, or any other suitable indication of resolution. In some embodiments, the resolution is a function of pixels within the image. For example, the resolution may be a count of horizontal and vertical pixels defining the size and aspect ratio of the bounding box. For example, the initial resolution of the bounding box may be determined to be 500 pixels by 500 pixels.

In operation 640, the bounding component 220 rescales the resolution of the bounding box to match the specified box resolution. The bounding component 220 may rescale the resolution by identifying a center point of the bounding box. Once the center of the bounding box is identified, the bounding component 220 crops portions of the bounding box outside of the specified box resolution with respect to the center point. The bounding component 220 may rescale the resolution of the bounding box based on the object of interest within the training image. In some embodiments, the specified box resolution may be predetermined based on a type of object of interest or based on information within the bounding box label. For example, the bounding box may rescale the resolution to a resolution of 80 pixels by 80 pixels. In some embodiments, one or more of the bounding component 220 and the detection component 230 may sample background image patches from areas within the image other than those occupied by the object of interest or the bounding box being rescaled.

In operation 650, the training component 260 initializes one or more model parameters. In some embodiments, the training component 260 initializes the one or more model parameters using a Gaussian distribution. The training component 260 may initialize the one or more parameters in a singular manner, such that only one model parameter is initialized and trained or tested at a particular time. Although described as initializing model parameters using a Gaussian distribution, other distributions may be used, such as a uniform distribution.

The model parameters may be understood as vectors of values. Initially, the model parameters or their values may be unknown. Initialization of a parameter may independently activate a parameter serving as a vector or part of a vector. In some embodiments, the parameters are initialized randomly (e.g., using a Gaussian distribution), using a uniform distribution, or using any other suitable distribution. The training component 260 may select a value (e.g., randomly or according to a distribution method) between upper and lower bounds. In some instances, the parameters may be initialized using predetermined values. The values used to initialize the parameters may be based on color, saturation, brightness, grayscale, lightness, or other values within the image, or characteristic of objects to be detected during a training process. For example, the upper and lower bounds may be based on the color values of the image. Where the color values are between zero and two hundred fifty-six, the upper and lower bounds may be positioned between the aforementioned values. Further, the parameter values may be selected from between zero and two hundred fifty-six.

In operation 660, the training component 260 iteratively adjusts the one or more model parameters to obtain an averaged loss function value. The averaged loss value may be determined for an object function. In some embodiments, the training component 260 iteratively adjusts the one or more model parameters until the averaged loss function value falls below a loss threshold. In some instances, the training component 260 iteratively adjusts the one or more model parameters until a change in averaged loss function values resulting from iterations of the one or more model parameters falls below a change threshold. Iterations resulting in changes between a plurality of averaged loss function values falling below the change threshold may indicate convergence of the machine learning model. The object function may be a softmax function giving a logistic regression loss. The model training performed by the training component 260 may perform an optimization (e.g., theoretically optimize) of the object function averaged over the set of training images. In some instances, the optimization is performed by gradient descent and the gradients may be calculated with back propagation.

The operation 660 may train object localization with the ranking loss function. In some example embodiments, the ranking loss function may be as shown in Equation 1, as follows:

$$L(f,X)=1<i,j<n(0,f(xi)-f(xj)+c)1(yj-yi-\alpha)$$

As shown in Equation 1. "f" is a function outputting a confidence score for an object or object category. "yi" is a maximum intersection over union (IoU) of training example "xi" to a ground truth object in the object category, "1" may be an indicator function, and "c" is a margin for hinge loss and "α" may control the pair sampling criteria. The ranking loss function may use a set of N images (e.g., the set of training images). The ranking loss function may operate as a summation over all possible pairs of objects or images among the set of training images. Minimization of the ranking loss function may produce a rank for training examples having a smallest (e.g., theoretically smallest) disparity to a natural IoU based rank. In some instances, enumeration pairs within the set of training images may be considered where a difference in ground truth IoU exceeds a threshold, controlled by the ranking loss function. The pairs may be sorted by loss function values in descending order. In these instances, a subset of pairs may be used for training operations. In some instances, the subset of pairs may be a set of top pairs based on the loss function values. The procedure may be performed similarly to a hard negative mining operation.

Figure 7:
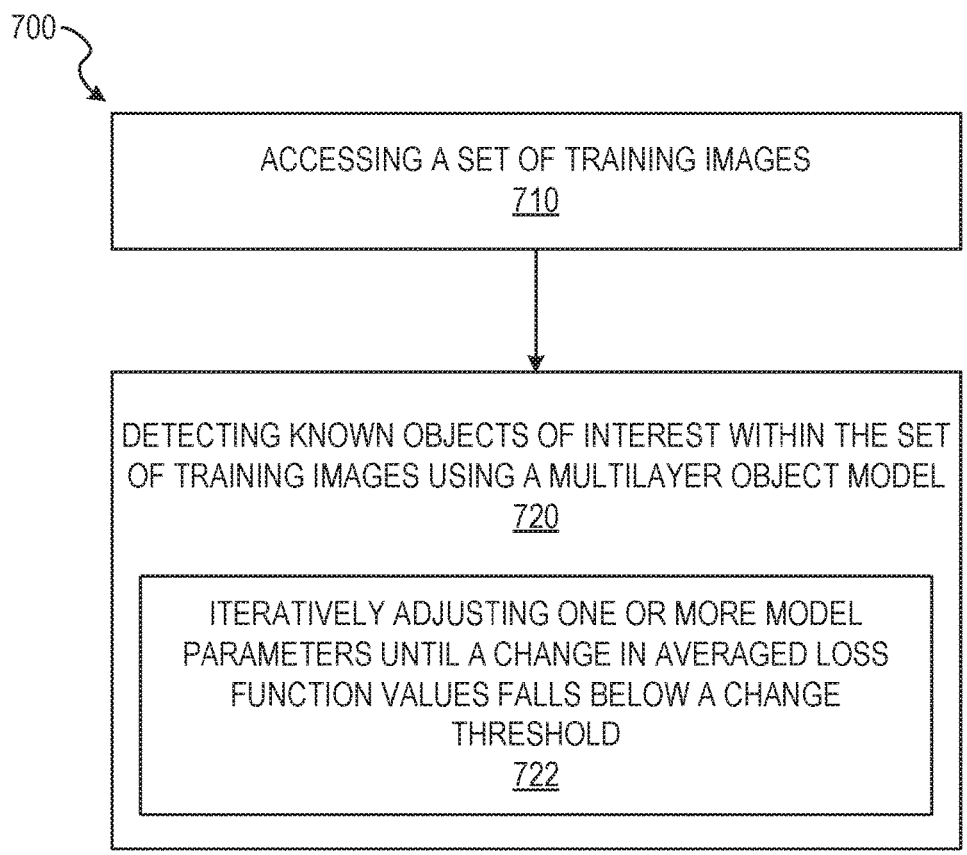
FIG. 7 is a flow diagram illustrating an example method for detecting and identifying objects within an image, according to some example embodiments.

FIG. 7 shows a flow diagram illustrating an example method 700 for modeling and identifying objects of interest within an image, a set of images, or frames within a video stream. The operations of method 700 may be performed by components of the object detection system 160. In some instances, certain operations of the method 700 may be performed using one or more operations of the methods 300, 400, 500, or 600 or as sub-operations of one or more operations of the methods 300, 400, 500, or 600, as will be explained in more detail below. In some embodiments, the method 700 trains the multilayer object model using one or more operations described below. In training the multilayer object model, the method 700 may pre-train the multilayer object model to learn translation/scale specific features.

In operation 710 the access component 210 accesses a set of training images. Each training image depicts a known object of interest. The set of training images may be accessed in a manner similar to or the same as that described with respect to operations 310 or 610.

In operation 720 the training component 260 detects the known objects of interest within the set of training images using the multilayer object model. The training component 260 performs the detection with one or more layers of the multilayer object model set at a first resolution and one or more layers of the multilayer object model set at a second resolution. In some embodiments, the training component 260 may detect the known objects of interest in cooperation with the detection component 230.

In some embodiments, the training component 260 performs operation 722 as part of or in conjunction with operation 720. In operation 722, the training component 260 iteratively adjusts one or more model parameters to obtain an averaged loss function value below a loss threshold. The averaged loss function value may be obtained for two or more instances of a training image of the set of training images. Each of the two or more instances of the training image have distinct resolutions.

Figure 8:
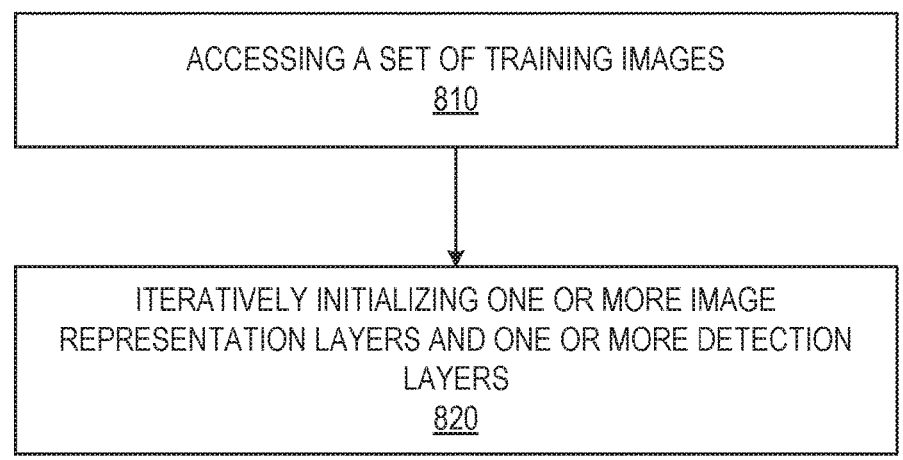
FIG. 8 is a flow diagram illustrating an example method for detecting and identifying objects within an image, according to some example embodiments.

FIG. 8 shows a flow diagram illustrating an example method 800 for modeling and identifying objects within an image, a set of images, or frames within a video stream. The operations of method 800 may be performed by components of the object detection system 160. In some instances, certain operations of the method 800 may be performed using one or more operations of the methods 300, 400, 500, 600, or 700 or as sub-operations of one or more operations of the methods 300, 400, 500, 600, or 700, as will be explained in more detail below. In some embodiments, the method 800 trains a set of detection layers of the multilayer object model.

In operation 810, the access component 210 accesses a set of training images. Each training image depicts a known object of interest and contains at least one bounding box. The bounding box comprises a tuple indicating coordinates of the bounding box within a training image and a classification label for the object of interest. The access component 210 may access the set of training images in a manner similar to or the same as described with respect to operations 310, 610, or 710.

In operation 820, the training component 260 iteratively initializes one or more image representation layers of the set of image representation layers and one or more detection layers of the set of detection layers. In some embodiments, the one or more image representation layers may be initialized from the multilayer object model as pre-trained in the manner described with respect to the method 700. The one or more image representation layers may be selected from a model which has previously been trained and is distinct from the model being trained in the method 800.

The image representation layers may be associated with a first model, previously trained. The first model may have been trained as a classification model for objects within a set of initial training images. The set of initial training images may lack spatial references to placement of the objects within the initial training images. The first model may be a classification model configured to output a categorical label applying to an entire training image, identifying an object of interest within the training image without indication of a location of the object of interest within the training image. In some embodiments, the model being trained by the method 800 is a second model incorporating at least a portion of the image representation layers of the first model. The second model may incorporate and, in the method 800, train the set of detection layers to output categorical labels for the training images representing objects of interest within the training images and spatial orientation (e.g., location) information indicating a location of the object of interest within the training image. In some embodiments, the training component 260 adjusts one or more parameters of the one or more image representation layers and the one or more detection layers to obtain a ranking loss function value. The ranking loss function value is obtained below a loss threshold for the set of training images or as a set of values, the change between which is below a change threshold.

Modules, Components, and Logic

Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Applications

Figure 9:
FIG. 9 is a user interface diagram depicting an example mobile device and mobile operating system interface, according to some example embodiments.

FIG. 9 illustrates an example mobile device 900 executing a mobile operating system (e.g., IOS™, ANDROID™, WINDOWS® Phone, or other mobile operating systems), consistent with some embodiments. In one embodiment, the mobile device 900 includes a touch screen operable to receive tactile data from a user 902. For instance, the user 902 may physically touch 904 the mobile device 900, and in response to the touch 904, the mobile device 900 may determine tactile data such as touch location, touch force, or gesture motion. In various example embodiments, the mobile device 900 displays a home screen 906 (e.g., Springboard on IOS™) operable to launch applications or otherwise manage various aspects of the mobile device 900. In some example embodiments, the home screen 906 provides status information such as battery life, connectivity, or other hardware statuses. The user 902 can activate user interface elements by touching an area occupied by a respective user interface element. In this manner, the user 902 interacts with the applications of the mobile device 900. For example, touching the area occupied by a particular icon included in the home screen 906 causes launching of an application corresponding to the particular icon.

The mobile device 900, as shown in FIG. 9, includes an imaging device 908. The imaging device 908 may be a camera or any other device coupled to the mobile device 900 capable of capturing a video stream or one or more successive images. The imaging device 908 may be triggered by the object detection system 160 or a selectable user interface element to initiate capture of a video stream or succession of images and pass the video stream or succession of images to the object detection system 160 for processing according to the one or more methods described in the present disclosure.

Many varieties of applications (also referred to as "apps") can be executing on the mobile device 900, such as native applications (e.g., applications programmed in Objective-C. Swift. or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 900 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 900 includes a social messaging app 910 such as SNAPCHAT® that, consistent with some embodiments, allows users to exchange ephemeral messages that include media content. In this example, the social messaging application 910 can incorporate aspects of embodiments described herein. For example, in some embodiments the social messaging application 910 includes an ephemeral gallery of media created by users the social messaging application 910. These galleries may consist of videos or pictures posted by a user and made viewable by contacts (e.g., "friends") of the user. Alternatively, public galleries may be created by administrators of the social messaging application 910 consisting of media from any users of the application (and accessible by all users). In yet another embodiment, the social messaging application 910 may include a "magazine" feature which consists of articles and other content generated by publishers on the social messaging application's platform and accessible by any users. Any of these environments or platforms may be used to implement concepts of the embodiments of the present disclosure.

In some embodiments, an ephemeral message system may include messages having ephemeral video clips or images which are deleted following a deletion trigger event such as a viewing time or viewing completion. In such embodiments, a device implementing the object detection system 160 may identify, track, extract, and generate representations of a face within the ephemeral video clip, as the ephemeral video clip is being captured by the device 900, and transmit the ephemeral video clip to another device using the ephemeral message system.

Software Architecture

Figure 10:
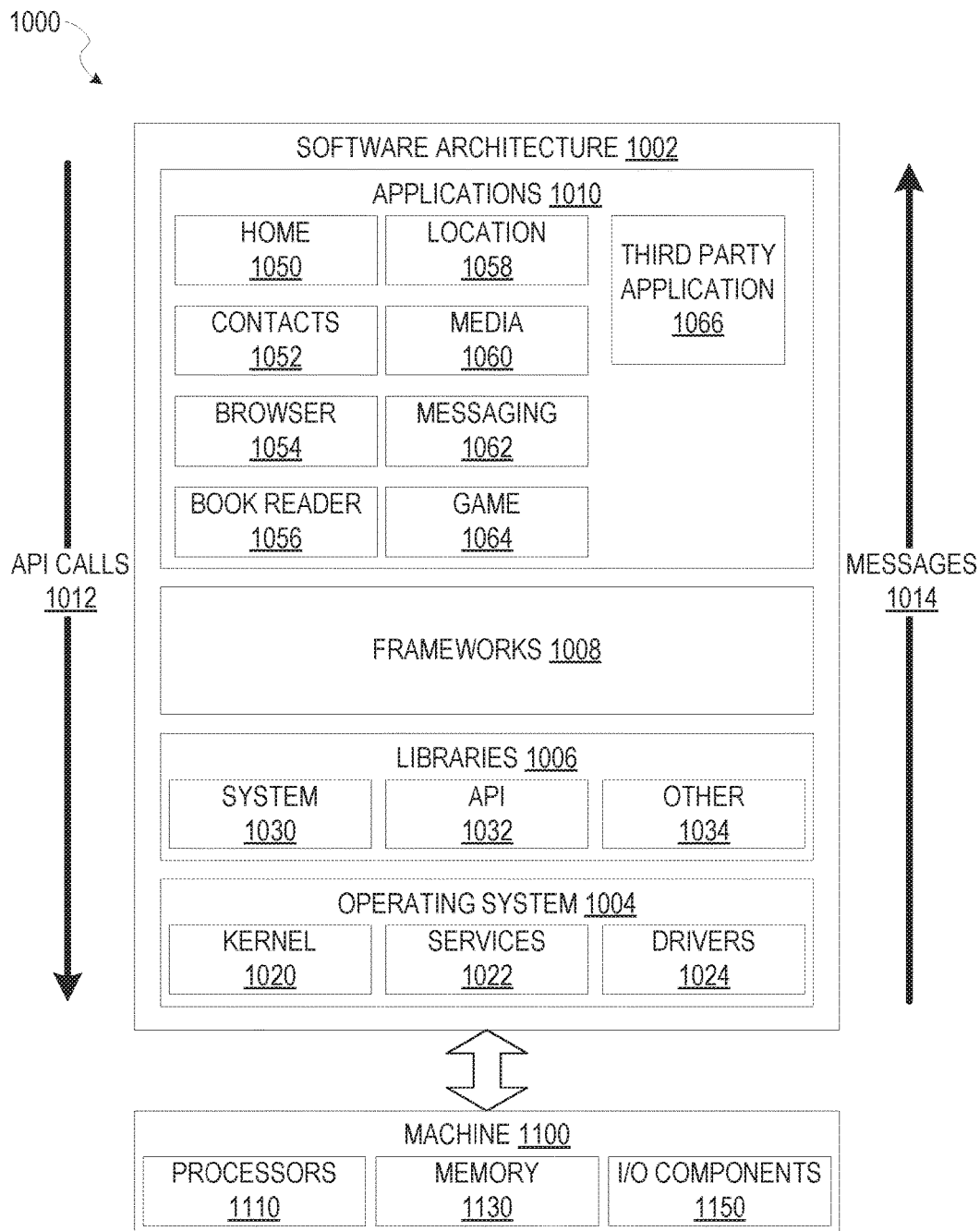
FIG. 10 is a block diagram illustrating an example of a software architecture that may be installed on a machine, according to some example embodiments.

FIG. 10 is a block diagram 1000 illustrating an architecture of software 1002, which can be installed on the devices described above. FIG. 10 is merely a non-limiting example of a software architecture, and it will be appreciated that many other architectures can be implemented to facilitate the functionality described herein. In various embodiments, the software 1002 is implemented by hardware such as machine 1100 of FIG. 11 that includes processors 1110, memory 1130, and I/O components 1150. In this example architecture, the software 1002 can be conceptualized as a stack of layers where each layer may provide a particular functionality. For example, the software 1002 includes layers such as an operating system 1004, libraries 1006, frameworks 1008, and applications 1010. Operationally, the applications 1010 invoke application programming interface (API) calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers. BLUETOOTH® drivers, flash memory drivers, serial communication drivers (e.g., Universal Serial Bus (USB) drivers). WI-FI® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec. Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphic user interface (GUI) functions, high-level resource management, high-level location services, and so forth. The frameworks 1008 can provide a broad spectrum of other APIs that can be utilized by the applications 1010, some of which may be specific to a particular operating system or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications such as a third-party application 1066. According to some embodiments, the applications 1010 are programs that execute functions defined in the programs. Various programming languages can be employed to create the applications 1010, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third-party application 1066 can invoke the API calls 1012 provided by the operating system 1004 to facilitate functionality described herein.

Example Machine Architecture and Machine-Readable Medium

Figure 11:
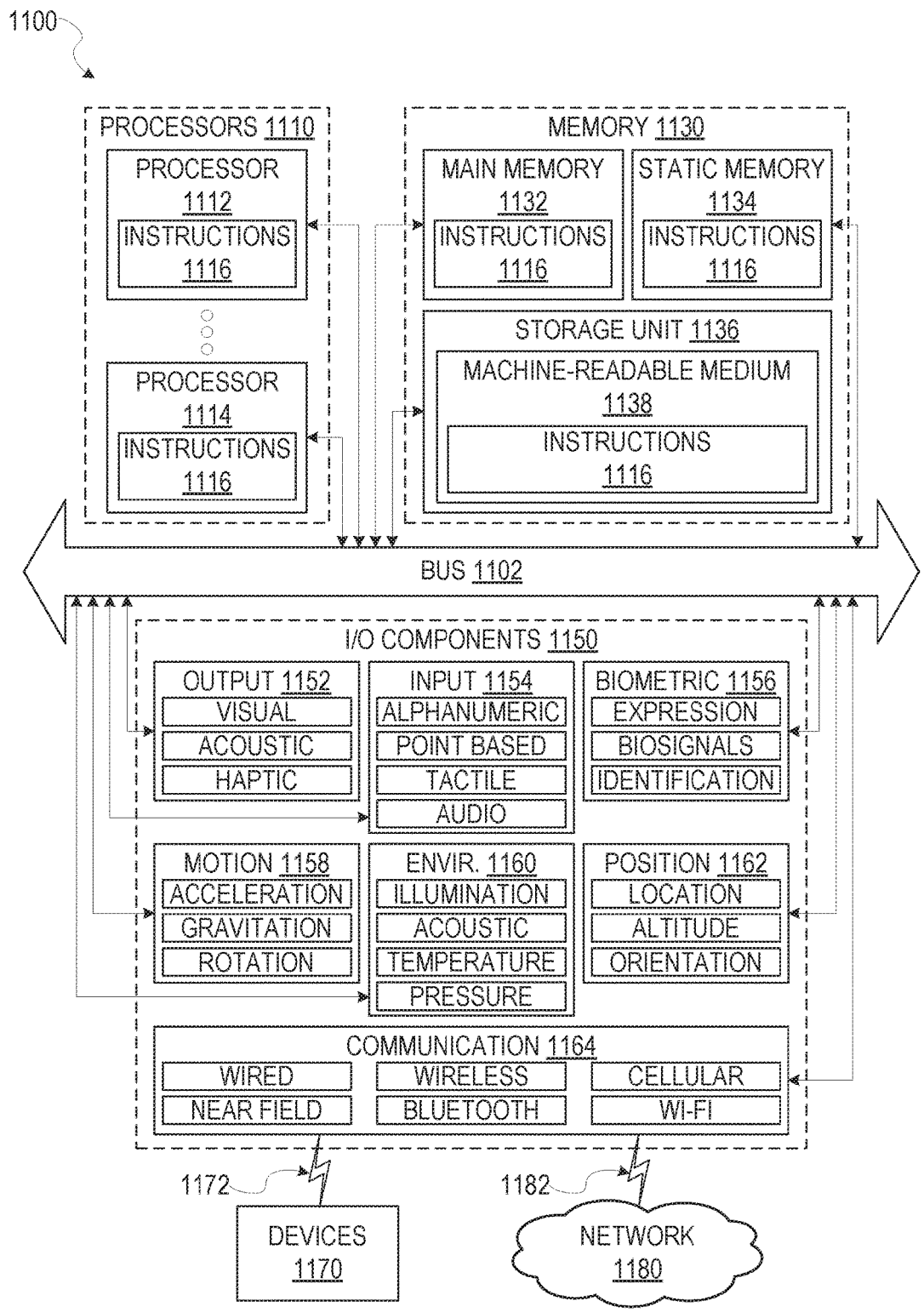
FIG. 11 is a block diagram presenting a diagrammatic representation of a machine in the form of a computer system within which a set of instructions may be executed for causing the machine to perform any of the methodologies discussed herein, according to an example embodiment.

FIG. 11 is a block diagram illustrating components of a machine 1100, according to some embodiments, able to read instructions (e.g., processor-executable instructions) from a machine-readable medium (e.g., a non-transitory machine-readable storage medium) and perform any of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any of the methodologies discussed herein can be executed. In alternative embodiments, the machine 1100 operates as a standalone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1112 and a processor 1114 that may execute the instructions 1116. The term "processor" is intended to include multi-core processors that may comprise two or more independent processors (also referred to as "cores") that can execute instructions 1116 contemporaneously. Although FIG. 11 shows multiple processors 1110, the machine 1100 may include a single processor with a single core, a single processor with multiple cores (e.g., a multi-core processor), multiple processors with a single core, multiple processors with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown in an example embodiment to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by the processors of the machine 1100 (e.g., processors 1110), cause the machine 1100 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium other non-volatile memory (e.g., Erasable Programmable Read-Only Memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, Near Field Communication (NFC) components, BLUETOOTH® components (e.g., BLUETOOTH® Low Energy). WI-FI® components, and other communication components to provide communication via other modalities. The devices 1170 may be another machine or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code. Aztec Code, Data Matrix, Dataglyph, MaxiCode. PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology. General Packet Radio Service (GPRS) technology. Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX). Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium is incapable of movement; the medium should be considered as being transportable from one physical location to another. Additionally, since the machine-readable medium 1138 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A device implemented method for image recognition, the method comprising:
    accessing, using one or more processors of the device coupled to a memory of the device, an image depicting an object of interest and a background within a field of view;
    detecting, by the one or more processors using a set of detection layers of the multilayer object model, at least a portion of the object of interest within the image;
    detecting, by the one or more processors using a set of detection layers of the multilayer object model, at least a portion of the background within the image;
    extracting, by the one or more processors using a set of image representation layers of the multilayer object model comprising a lower image representation layer and a higher image representation layer, context information from the portion of the background, wherein a layer output of the higher image representation layer includes the extracted context information; and
    identifying, by the one or more processors, the object of interest from the detected portion of the object of interest and the context information, using the set of image representation layers of the multilayer object model, passing the layer output of the higher image representation layer including the extracted context information backward to the lower image representation layer.

2. The method of claim 1, further comprising generating, by the one or more processors configured by the multilayer object model, a set of bounding boxes within the image, and wherein generating the set of bounding boxes comprises:
    identifying a set of coordinates within the image, the set of coordinates including an indication of one or more boundaries for the image;
    determining a set of sizes and a set of aspect ratios for the set of bounding boxes;
    determining a distribution of bounding boxes to encompass each coordinate of the set of coordinates in at least one bounding box of the set of bounding boxes; and
    generating the set of bounding boxes to distribute the set of bounding boxes uniformly over the image, wherein each bounding box of the set of bounding boxes is generated with a size included in the set of sizes and an aspect ratio included in the set of aspect ratios.

3. The method of claim 2, wherein the set of bounding boxes includes at least one bounding box having a first size and a first aspect ratio and at least one bounding box having a second size and a second aspect ratio, and wherein the first size is distinct from the second size and the first aspect ratio is distinct from the second aspect ratio.

4. The method of claim 1, wherein detecting the portion of the object of interest using the set of detection layers of the multilayer object model further comprises:
    generating, by the one or more processors configured by the multilayer object model, a set of bounding boxes within the image;
    detecting part of the portion of the object of interest in a first bounding box of the set of bounding boxes using a first detection layer, the first detection layer associated with a first scale corresponding to the first bounding box; and
    detecting part of the portion of the object of interest in a second bounding box of the set of bounding boxes using a second detection layer, the second detection layer associated with a second scale corresponding to the second bounding box.

5. The method of claim 4, wherein the first detection layer generates a first confidence score and a first set of coordinates for the part of the object of interest depicted within the first bounding box and the second detection layer generates a second confidence score and a second set of coordinates for the part of the object of interest depicted within the second bounding box.

6. The method of claim 1, wherein the layer output of the higher image representation layer is passed backward to the lower image representation layer using a deconvolution layer of the multilayer object model.

7. The method of claim 1 further comprising training the multilayer object model by:
    accessing a set of training images, each training image depicting a known object of interest;
    identifying a set of bounding boxes within the set of training images, each bounding box having a set of coordinates identifying a location within a training image, a resolution, and a label;
determining the resolution of a bounding box exceeds a specified box resolution;
rescaling the resolution of the bounding box to match the specified box resolution by identifying a center point of the bounding box and cropping portions of the bounding box outside of the specified box resolution with respect to the center point;
initializing one or more model parameters; and
iteratively adjusting the one or more model parameters to until a change in averaged loss function values resulting from iterations of the one or more model parameters falls below a change threshold.

8. The method of claim 1, further comprising training the multilayer object model by:
accessing a set of training images, each training image depicting a known object of interest; and
detecting the known objects of interest within the set of training images using the multilayer object model, the detection performed with one or more layers of the multilayer object model set at a first resolution, and one or more layers of the multilayer object model set at a second resolution.

9. The method of claim 8, wherein detecting the known objects of interest further comprises:
iteratively adjusting one or more model parameters until a change in averaged loss function values falls below a change threshold, the averaged loss function obtained for two or more instances of a training image of the set of training images, each of the two or more instances of the training image having distinct resolutions.

10. The method of claim 1, further comprising training the set of detection layers of the multilayer object model by:
accessing a set of training images, each training image depicting a known object of interest and containing at least one bounding box comprising a tuple indicating coordinates of the bounding box within a training image and a classification label for the known object of interest; and
iteratively initializing one or more image representation layers of the set of image representation layers and one or more detection layers of the set of detection layers and adjusting one or more parameters of the one or more image representation layers and the one or more detection layers until a change in averaged loss function values resulting from iterations of the one or more model parameters falls below a change threshold.

11. A system comprising:
one or more processors; and
a processor-readable storage device coupled to the one or more processors, the processor-readable storage device storing processor-executable instructions that, when executed by the one or more processors, cause the one or more processors to perform operations comprising:
accessing an image depicting an object of interest and a background within a field of view;
detecting, by the one or more processors using a set of detection layers of the multilayer object model, at least a portion of the object of interest within the image;
detecting, by the one or more processors using a set of detection layers of the multilayer object model, at least a portion of the background within the image;
extracting, by the one or more processors using a set of image representation layers of the multilayer object model comprising a lower image representation layer and a higher image representation layer, context information from the portion of the background, wherein a layer output of the higher image representation layer includes the extracted context information; and
identifying, by the one or more processors, the object of interest from the detected portion of the object of interest and the context information, using the set of image representation layers of the multilayer object model, by passing the layer output of the higher image representation layer including the extracted context information backward to the lower image representation layer.

12. The system of claim 11, wherein the operations further comprise:
generating, by the one or more processors configured by the multilayer object model, a set of bounding boxes within the image, and wherein generating the set of bounding boxes comprises:
identifying a set of coordinates within the image, the set of coordinates including an indication of one or more boundaries for the image;
determining a set of sizes and a set of aspect ratios for the set of bounding boxes;
determining a distribution of bounding boxes to encompass each coordinate of the set of coordinates in at least one bounding box of the set of bounding boxes; and
generating the set of bounding boxes to distribute the set of bounding boxes uniformly over the image, wherein each bounding box of the set of bounding boxes is generated with a size included in the set of sizes and an aspect ratio included in the set of aspect ratios.

13. The system of claim 11, wherein detecting the portion of the object of interest using the set of detection layers of the multilayer object model further comprises:
detecting part of the portion of the object of interest in a first bounding box of the two or more bounding boxes using a first detection layer, the first detection layer associated with a first scale corresponding to the first bounding box; and
detecting part of the portion of the object of interest in a second bounding box of the two or more bounding boxes using the second detection layer, the second detection layer associated with a second scale corresponding to the second bounding box.

14. The system of claim 11, wherein the layer output of the higher image representation layer is passed backward to the lower image representation layer using a deconvolution layer of the multilayer object model.

15. The system of claim 11 further comprising training the multilayer object model by:
accessing a set of training images, each training image depicting a known object of interest;
identifying a set of bounding boxes within the set of training images, each bounding box having a set of coordinates identifying a location within a training image, a resolution, and a label;
determining the resolution of a bounding box exceeds a specified box resolution;
rescaling the resolution of the bounding box to match the specified box resolution by identifying a center point of the bounding box and cropping portions of the bounding box outside of the specified box resolution with respect to the center point;
initializing one or more model parameters; and
iteratively adjusting the one or more model parameters until a change in averaged loss function values resulting from iterations of the one or more model parameters falls below a change threshold.

16. A processor-readable storage device storing processor-executable instructions that, when executed by one or more processors of a machine, cause the machine to perform operations comprising:
- accessing an image depicting an object of interest and a background within a field of view;
- detecting, by the one or more processors using a set of detection layers of the multilayer object model, at least a portion of the object of interest within the image;
- detecting, by the one or more processors using a set of detection layers of the multilayer object model, at least a portion of the background within the image;
- extracting, by the one or more processors using a set of image representation layers of the multilayer object model comprising a lower image representation layer and a higher image representation layer, context information from the portion of the background, wherein a layer output of the higher image representation layer includes the extracted context information; and
- identifying, by the one or more processors, the object of interest from the detected portion of the object of interest and the context information, using the set of image representation layers of the multilayer object model, by passing the layer output of the higher image representation layer including the extracted context information backward to the lower image representation layer.

17. The processor-readable storage device of claim 16, wherein the operations further comprise:
- generating, by the one or more processors configured by the multilayer object model, a set of bounding boxes within the image, and wherein generating the set of bounding boxes comprises:
- identifying a set of coordinates within the image, the set of coordinates including an indication of one or more boundaries for the image;
- determining a set of sizes and a set of aspect ratios for the set of bounding boxes;
- determining a distribution of bounding boxes to encompass each coordinate of the set of coordinates in at least one bounding box of the set of bounding boxes; and
- generating the set of bounding boxes to distribute the set of bounding boxes uniformly over the image, wherein each bounding box of the set of bounding boxes is generated with a size included in the set of sizes and an aspect ratio included in the set of aspect ratios.

18. The processor-readable storage device of claim 16, wherein detecting the portion of the object of interest using the set of detection layers of the multilayer object model further comprises:
- detecting part of the portion of the object of interest in a first bounding box of the two or more bounding boxes using the first detection layer, the first detection layer associated with a first scale corresponding to the first bounding box; and
- detecting part of the portion of the object of interest in a second bounding box of the two or more bounding boxes using the second detection layer, the second detection layer associated with a second scale corresponding to the second bounding box.

19. The processor-readable storage device of claim 16, wherein the layer output of the higher image representation layer is passed backward to the lower image representation layer using a deconvolution layer of the multilayer object model.

20. The processor-readable storage device of claim 16 further comprising training the multilayer object model by:
- accessing a set of training images, each training image depicting a known object of interest;
- identifying a set of bounding boxes within the set of training images, each bounding box having a set of coordinates identifying a location within a training image, a resolution, and a label;
- determining the resolution of a bounding box exceeds a specified box resolution;
- rescaling the resolution of the bounding box to match the specified box resolution by identifying a center point of the bounding box and cropping portions of the bounding box outside of the specified box resolution with respect to the center point;
- initializing one or more model parameters; and
- iteratively adjusting the one or more model parameters until a change in averaged loss function values resulting from iterations of the one or more model parameters falls below a change threshold.

* * * * *

UNITED STATES PATENT AND TRADEMARK OFFICE
CERTIFICATE OF CORRECTION

PATENT NO. : 10,346,723 B2  
APPLICATION NO. : 15/340675  
DATED : July 9, 2019  
INVENTOR(S) : Han et al.

Page 1 of 1

It is certified that error appears in the above-identified patent and that said Letters Patent is hereby corrected as shown below:

In the Claims

In Column 28, Line 7, in Claim 1, before "passing", insert --by--

Signed and Sealed this  
Eighth Day of December, 2020

Andrei Iancu  
*Director of the United States Patent and Trademark Office*